United States Patent
Hirose (10) Patent No.: US 10,860,270 B2
(45) Date of Patent: Dec. 8, 2020

(54) APPARATUS INCLUDING PRINTING FUNCTION, ITS CONTROL METHOD, AND STORAGE MEDIUM

(71) Applicant: CANON KABUSHIKI KAISHA, Tokyo (JP)

(72) Inventor: Fumiaki Hirose, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/127,394

(22) Filed: Sep. 11, 2018

(65) Prior Publication Data
US 2019/0087141 A1  Mar. 21, 2019

(30) Foreign Application Priority Data
Sep. 21, 2017  (JP) .................. 2017-181699

(51) Int. Cl.
*G06F 3/12*  (2006.01)
*G06K 15/02*  (2006.01)

(52) U.S. Cl.
CPC .......... *G06F 3/1264* (2013.01); *G06F 3/1205* (2013.01); *G06F 3/1208* (2013.01); *G06F 3/1248* (2013.01); *G06F 3/1254* (2013.01); *G06F 3/1258* (2013.01); *G06F 3/1285* (2013.01); *G06F 3/1268* (2013.01); *G06F 3/1295* (2013.01)

(58) Field of Classification Search
None
See application file for complete search history.

(56) References Cited

U.S. PATENT DOCUMENTS

| | | | | |
|---|---|---|---|---|
| 5,517,295 A | * | 5/1996 | Kaneko | G03G 15/5012 399/19 |
| 6,198,541 B1 | * | 3/2001 | Okimoto | G06K 15/00 358/1.14 |
| 6,466,326 B1 | * | 10/2002 | Shima | G06F 3/1211 358/1.12 |
| 6,621,597 B1 | * | 9/2003 | Kuwahara | H04N 1/0035 358/448 |

(Continued)

FOREIGN PATENT DOCUMENTS

JP  2008-155451 A  7/2008

*Primary Examiner* — Beniyam Menberu
(74) *Attorney, Agent, or Firm* — Venable LLP (57) ABSTRACT

An apparatus for performing data processing for a print job, includes a controller to control data processing in accordance with a number-of-copies setting of a print job. The data processing includes first data processing in which predetermined image processing is performed on first image data included in the print job to generate second image data, and the generated second image data is printed without spooling; and second data processing in which predetermined image processing is performed on first image data included in the print job to generate second image data, the generated second image data is spooled, and the spooled second image data is repeatedly used for printing. When a change of the number-of-copies setting is accepted during job execution by the first data processing, the controller switches from the first data processing to the second data processing in response to the remaining number of copies.

12 Claims, 8 Drawing Sheets

(56) References Cited

U.S. PATENT DOCUMENTS

| | | | | |
|---|---|---|---|---|
| 8,848,212 B2* | 9/2014 | Shimada | ............... | B42C 9/0031 |
| | | | | 358/1.13 |
| 2004/0141202 A1* | 7/2004 | Okigami | ................. | G06F 3/121 |
| | | | | 358/1.15 |
| 2007/0076242 A1* | 4/2007 | Kanai | ................... | G06F 3/1204 |
| | | | | 358/1.14 |
| 2007/0201071 A1* | 8/2007 | Yamada | ................ | G06F 3/1264 |
| | | | | 358/1.13 |
| 2008/0049251 A1* | 2/2008 | Shimada | .................. | B42B 4/00 |
| | | | | 358/1.15 |
| 2008/0168450 A1* | 7/2008 | Tarumi | .................. | G06Q 10/00 |
| | | | | 718/102 |
| 2009/0257078 A1* | 10/2009 | Sawada | ................ | G06F 21/608 |
| | | | | 358/1.14 |
| 2010/0231937 A1* | 9/2010 | Tsunekawa | ........... | G06F 3/1258 |
| | | | | 358/1.9 |
| 2012/0099138 A1* | 4/2012 | Hirata | ................ | G03G 15/5087 |
| | | | | 358/1.14 |
| 2016/0062711 A1* | 3/2016 | Hidaka | .................. | H04N 1/648 |
| | | | | 358/1.13 |

\* cited by examiner

APPARATUS INCLUDING PRINTING FUNCTION, ITS CONTROL METHOD, AND STORAGE MEDIUM

BACKGROUND OF THE INVENTION

Field of the Invention

The present invention relates to a control technique of a data processing sequence in an apparatus including a print function.

Description of the Related Art

In an apparatus including printing functions as represented by a multifunctional peripheral (MFP) (hereinafter simply referred to as a "printing apparatus"), printing is performed based on a job accompanied by printing processing such as copying and PDL printing. A user makes various kinds of print settings at the time of inputting the job such as simultaneous settings of, for example, a copy number setting (a number-of-copies setting) which specifies the number of copies to be printed and a combination setting which specifies adding a copy-forgery-inhibited pattern and the like on an original image. The printing apparatus performs printing in accordance with the print setting included in the inputted job, but there may be a case where some users desire to change the copy number setting, for example, after inputting of the job. In order to cope with such a case, there is proposed a technique capable of changing a print setting even after a job input (see Japanese Patent Laid-Open No. 2008-155451).

Figure 1A:
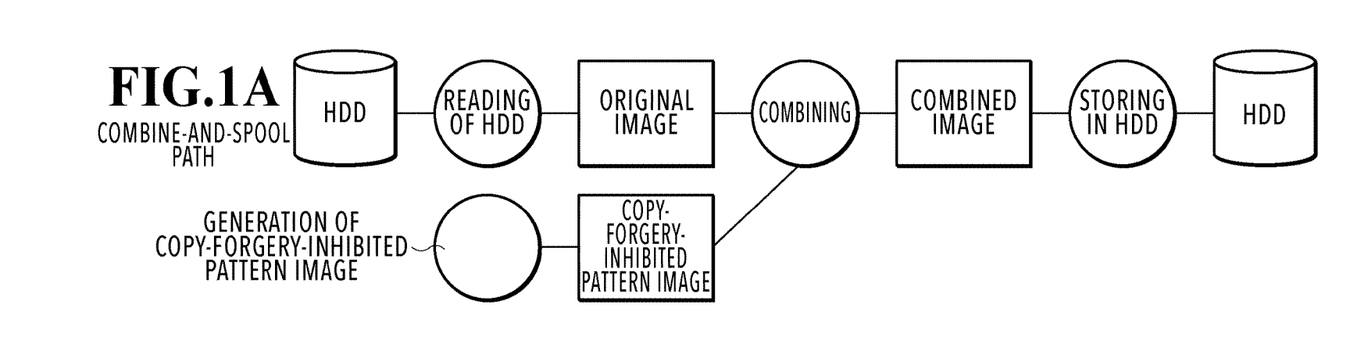
FIGS. 1A to 1C are diagrams illustrating data processing sequences (paths) in a printing apparatus.
Figure 1B:
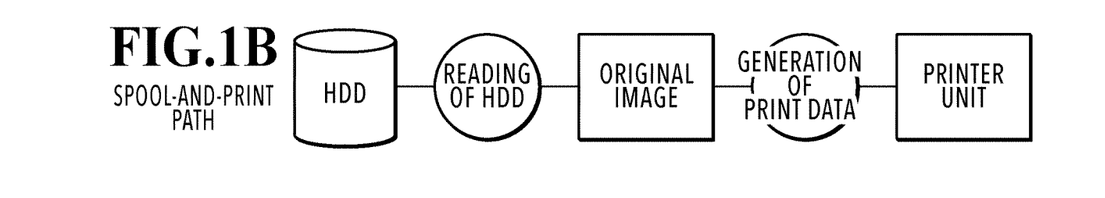
Figure 1C:
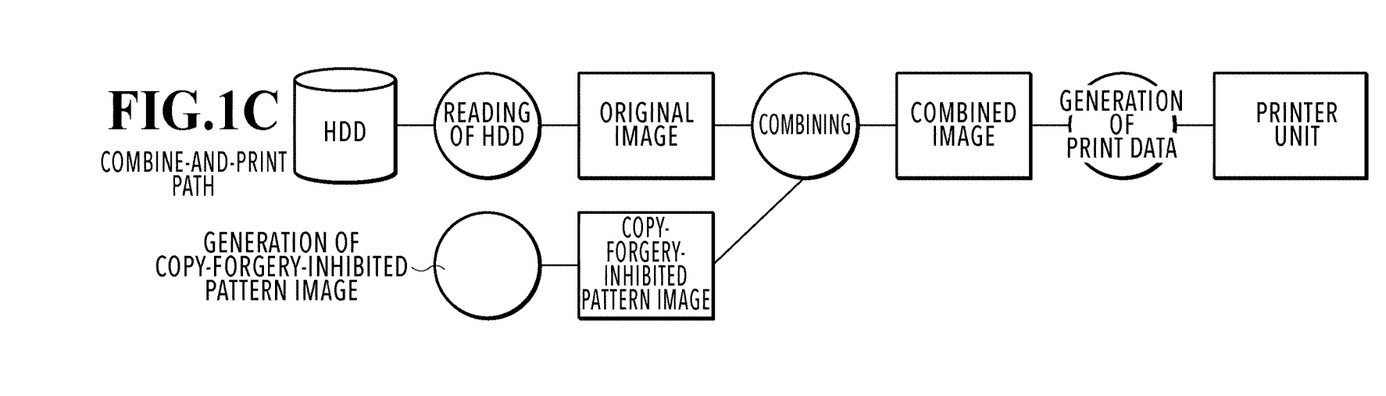

Let us assume that, for example, a job including print settings which include a "copy-forgery-inhibited pattern" specified as a combination setting and "10 copies" specified as a copy number setting is inputted. In this case, in the printing apparatus, the process of combining an original image and a copy-forgery-inhibited pattern image is firstly performed and the acquired combined image is used to make 10 copies of printing. At this time, there is a method of once spooling the combined image (storing in an HDD or the like) and using the spooled combined image for printing second and subsequent copies. FIG. 1A shows a data processing sequence (combine-and-spool path) which combines a copy-forgery-inhibited pattern image with an original image and spools the thus combined image. FIG. 1B shows a data processing sequence (spool-and-print path) in which a spooled image is printed. A reason for making such spool processing prior to printing is that, in a case of making printing of, for example, n copies or more (where n is an integer of 2 or more), the combination processing is considered as unnecessary in a case of repeating the combination processing and printing processing for every copy. FIG. 1C shows a data processing sequence (combine-and-print path) in a case where a copy-forgery-inhibited pattern image is combined with a spooled original image for performing printing. The larger the number of printing copies is, the shorter the time period required from job input to the completion of printing becomes in the case of performing the data processing sequence of the combine-and-spool path once and repeating that of the spool-and-print path thereafter for the number of copies rather than in the case of repeating the data processing sequence of the combine-and-print path for the number of copies.

As described above, an optimal data processing sequence may differ depending on the content of a print setting, but Japanese Patent Laid-Open No. 2008-155451 fails to disclose examining a data processing sequence so as to reduce a time period required until job completion. In other words, Japanese Patent Laid-Open No. 2008-155451 merely discloses allowing the change of a print setting after job input, but fails to consider optimization of the data processing sequence.

In consideration of the above problem, an object of the present invention is to reduce a time period required for printing by responding to the change of a print setting after job input and by optimizing a data processing sequence until job completion.

SUMMARY OF THE INVENTION

The apparatus of the present invention is an apparatus for performing data processing for a print job, the apparatus including a controller configured to control data processing in accordance with a number-of-copies setting of the print job. The data processing includes: first data processing in which predetermined image processing is performed on first image data included in the print job to generate second image data, and the generated second image data is printed without spooling; and second data processing in which predetermined image processing is performed on first image data included in the print job to generate second image data, the generated second image data is spooled, and the spooled second image data is repeatedly used for printing. In a case where a change of the number-of-copies setting is accepted during job execution by the first data processing, the controller switches from the first data processing to the second data processing in response to a remaining number of copies.

Further features of the present invention will become apparent from the following description of exemplary embodiments with reference to the attached drawings.

DESCRIPTION OF THE EMBODIMENTS

With reference to the drawings, explanations will be given below on embodiments for carrying out the present invention. It should be noted that the following embodiments do not limit to the scope of the claims, and all the combination of features explained in the embodiments are not necessarily essential for the summary of the invention.

(First Embodiment)

Figure 2:
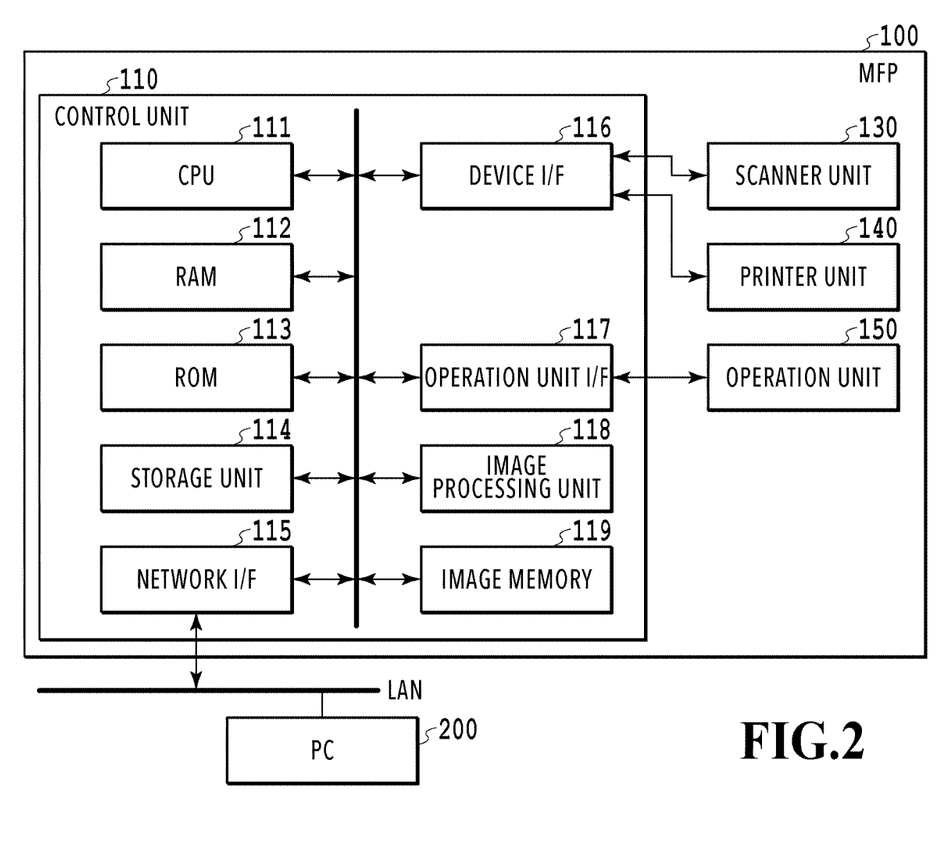
FIG. 2 is a block diagram showing a hardware configuration of an MFP.

FIG. 2 is a block diagram showing a hardware configuration of an MFP as a printing apparatus according to the present invention. An MFP 100 is an apparatus equipped with a plurality of printing functions such as PDL printing and copying. A job for PDL printing is composed of page description language (PDL) data which specifies a rendering content and header information including the above-described print settings. The input of a PDL print job is established such that a user uses a print driver (not shown) of a PC 200 to specify a document to be printed, makes a print setting, and gives an instruction to start printing. Further, the input of a copy job is established such that the user places a document to be read on a document platen (not shown) of the MFP 100, and then uses a user interface screen (to be described later) on the operation unit 150 to make a print setting and gives an instruction to start copying. It should be noted that, as for the print setting, a default content is prepared beforehand for each item, and unless otherwise explicitly instructed by the user, a job is inputted assuming that the print setting is made with the default content. An explanation will be given below for units constituting the MFP 100.

A control unit, or controller, 110 is connected with a scanner unit 130 which is an image input device and a printer unit 140 which is an image output device, and integrally controls the MFP 100. In addition, the control unit 110 is connected with the PC 200 via a network such as a LAN. The control unit 110 is further composed of each of units 111 to 119 as described below.

A CPU 111 loads various programs stored in a ROM 113 and a storage unit 114 on a RAM 112 to execute them, thereby implementing various functions in the MFP 100. The storage unit 114 is a large-scale storage device such as an HDD and an SSD for storing system software, image data, and so on. A network I/F 115 is an interface for exchanging various kinds of information with external apparatuses such as the PC 200 and the like via a network such as a LAN. A device I/F 116 is an interface for exchanging image data with the scanner unit 130 and the printer unit 140. An operation unit I/F 117 is an interface for outputting image data to be displayed on the operation unit 150 to the operation unit 150, and receiving information inputted to the operation unit 150 by the user. An image processing unit 118 executes predetermined image processing on PDL data associated with a PDL print job and on scan image data associated with a copy job to generate image data for printing that can be processed by the printer unit 140. An image memory 119 is a memory for temporarily loading image data to be processed by the image processing unit 118.

(Flow of Printing Control)

Figure 3:
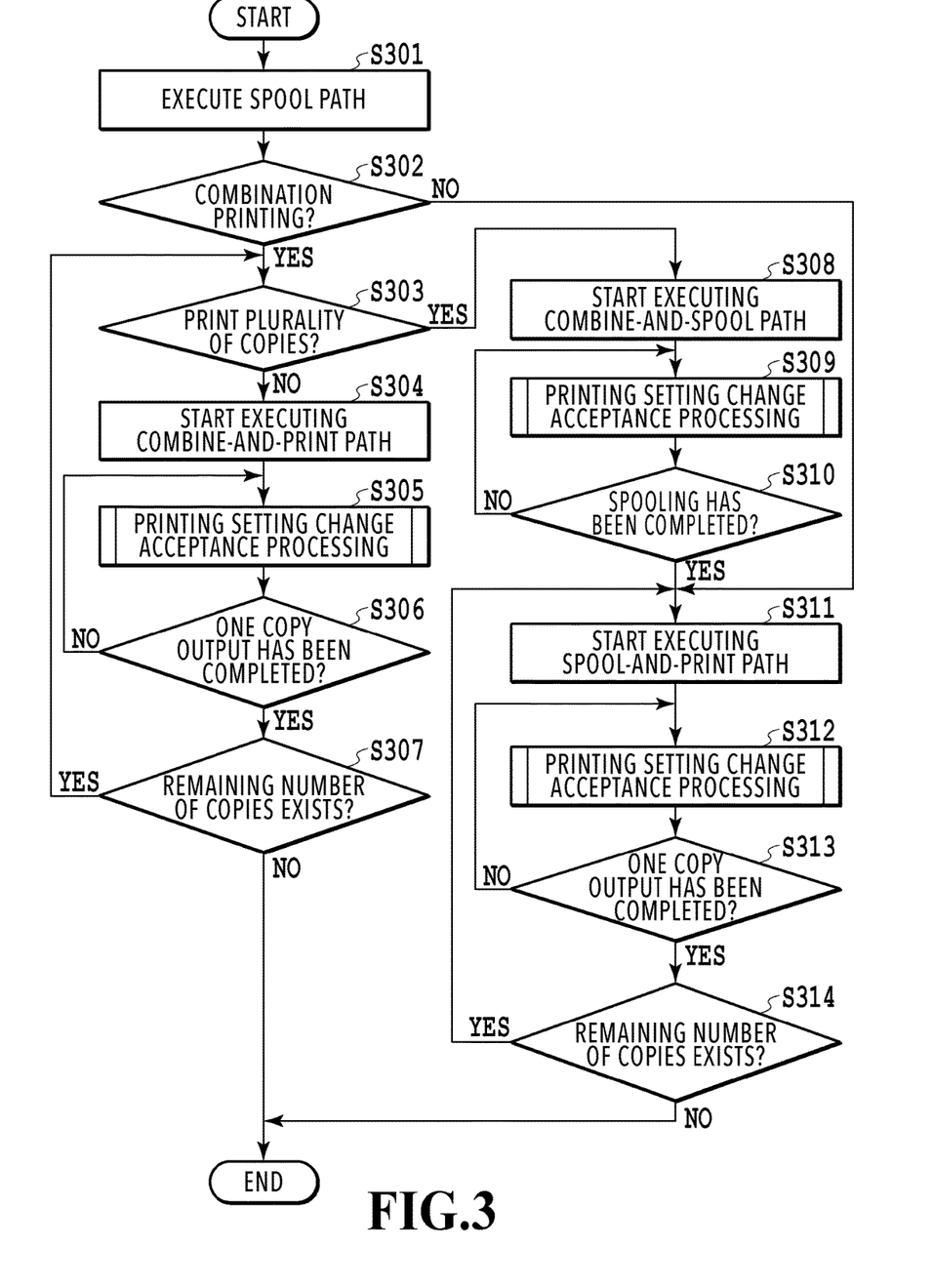
FIG. 3 is a flowchart showing the flow of printing control in a control unit.

Once a job accompanied by a printout such as PDL printing and copying is inputted into the MFP 100, the control unit 110 executes printing processing after making preprocessing in response to the job. For instance, in the case of a copy job, a set document is scanned, and processing to acquire an original image is executed as the preprocessing. Then, with respect to the acquired original image data, printing using a data processing sequence in response to the print setting is to be made. FIG. 3 is a flowchart showing the flow of printing control in the control unit 110. Once a PDL print job and a copy job are accepted by the control unit 110, the jobs are principally processed in the order of their acceptance, and the control flow of FIG. 3 is performed at a stage in which the above-described preprocessing is completed. It should be noted that the printer unit 140 of the MFP 100 according to the present embodiment employs an electrophotographic method using a toner as a color material, but the method is not limited to this. For instance, the present invention may also employ other methods such as an inkjet method which uses ink as a color material.

First of all, in Step 301, processing of spooling original image data associated with a job to be processed (spool path) is executed. In this spool path, predetermined image processing is executed by the image processing unit 118 for the original image associated with the job, and once the resultant image is loaded onto the image memory 119, it is spooled (stored) in the storage unit 114. The predetermined image processing differs depending on a job. In the case of a copy job, MTF correction processing which corrects an MTF of scanning that varies according to a scanning speed and attribute determination processing which generates attribute information by determining an attribute of each object within an image are performed. In a case of a PDL print job, processing of generating intermediate data by interpreting the PDL and RIP processing which converts the intermediate data into image data of a raster format (bitmap data), for example, are performed. It should be noted that, upon completion of the spooling, a storage area of the image memory 119 is released, and the loaded image data no longer exists in the image memory 119.

In Step 302, in the print setting of a job to be processed, determination is made as to whether a combination setting specifying combining an additional image such as a copy-forgery-inhibited pattern with an original image is set. In the printing accompanied by combination processing of such a predetermined additional image, besides the copy-forgery-inhibited pattern printing, there are, for example, bookbinding printing and form overlay printing. In a case where the combination setting is set, the process advances to Step 303. Meanwhile, in a case where the combination setting is not set, the process advances to Step 311 for shifting to the spool-and-print path.

In Step 303, in the current print setting, determination is made as to whether two or more copies are set for the copy number setting. In a case where the remaining number of copies are two or more copies (printing of a plurality of copies), the process advances to Step 308. Meanwhile, in a case where the remaining number of copies is one (printing of a single copy), the process advances to Step 304.

In Step 304, the execution of the above-described combine-and-print path (see FIG. 1C) is started. More specifically, first of all, original image data spooled in Step 301 is read out from the storage unit 114 to load onto the image memory 119. In parallel, an additional image such as a copy-forgery-inhibited pattern is generated and loaded onto the image memory 119 similarly. Then, the original image and the additional image are combined, and after the acquired combined image is reloaded onto the image memory 119, necessary processing such as quantization and conversion into a drive signal for a laser driver are performed. The thus acquired print data is sent to the printer unit 140 and a print medium on which an image is formed based on the print data is outputted. It should be noted that, since the storage area in the image memory 119 is released after the completion of the combine-and-print path, the combined image data loaded onto the image memory 119 cannot be reused.

In Step 305, change acceptance processing for a print setting is executed. This print setting change acceptance processing will be described later. In subsequent Step 306, determination is made as to whether a printout in units of copies (one copy output) has been completed (whether the printout for all pages of the combined image generated in Step 304 has been completed). In a case where one copy output has not been completed (an unprocessed page exists), the process returns to Step 305, and the output of the remaining pages and print setting change acceptance processing are continuously made. Meanwhile, in a case where one copy output has been completed (no unprocessed page exists), a value of the copy number setting is decremented by "1" and the process advances to Step 307.

In Step 307, determination is made as to whether the remaining number of copies exists in the copy number setting at the time of completing one copy output. As a result of the determination, in a case where the remaining number of copies is "0," the spooled (stored in the storage unit 114) image data is deleted to complete this processing. For instance, in a case where the copy number setting has not been changed in Step 305, the value "1" of the copy number setting at the time of completing one copy output is decremented to "0" for the remaining number of copies, and thus this processing is to be completed. Meanwhile, in a case where the copy number setting has been changed and then the remaining number of copies indicates "1" or more, the process returns to Step 303. Then, in a case where the remaining number of copies is "1," the processes in Step 304 and thereafter are repeated again, whereas in a case where the remaining number of copies is "2" or more, the process advances to Step 308.

In Step 308, the execution of the above-described combine-and-spool path (see FIG. 1A) is started. More specifically, first of all, original image data spooled in Step 301 is read out from the storage unit 114 to load onto the image memory 119. In addition, an additional image such as a copy-forgery-inhibited pattern is generated and loaded onto the image memory 119 similarly. Then, the original image and the additional image are combined, and the acquired combined image is reloaded onto the image memory 119 and is stored in the storage unit 114. As such, the combined image data stored in the storage unit 114 is stored until the execution of deletion processing, and therefore, such data can be reused.

Then, in Step 309, change acceptance processing for a print setting is executed. This print setting change acceptance processing will be described later. In subsequent Step 310, determination is made as to whether the combine-and-spool path has been completed. In the case of having not been completed, the process returns to Step 309. Meanwhile, in the case of having been completed, the process advances to Step 311.

In Step 311, out of the number n of copies specified in the copy number setting, the execution of the spool-and-print path (see FIG. 1B) for an m-th copy (n≥m) to be processed is started. This Step 311 is executed subsequent to the determination processing in Step 302 or the determination processing in Step 310. More specifically, first of all, data of a spooled image (original image or combined image stored in the storage unit 114) is read out and loaded onto the image memory 119. Then, necessary processing such as quantization by performing halftone processing and conversion into a drive signal for a laser driver are performed. The thus acquired print data is sent to the printer unit 140, and a print medium on which an image is formed based on the print data is outputted. In this spool-and-print path, spooled image data is repeatedly used, and therefore, the more the number of copies are, the more efficient the printout can be made.

In Step 312, change acceptance processing for a print setting is executed. This print setting change acceptance processing will be described later. In subsequent Step 313, as in Step 306, determination is made as to whether the printout of an m-th copy has been completed (whether the printout for images to be processed for all pages has been completed). In a case where the output of the m-th copy has not been completed (an unprocessed page exists), the process returns to Step 312, and the remaining page output and the print setting change acceptance processing are continuously made. Meanwhile, in a case where the output of the m-th copy has been completed (no unprocessed page exists), a value of the copy number setting is decremented by "1" and the process advances to Step 314.

In Step 314, in the copy number setting at the time of completing the output of the m-th copy, determination is made as to whether the remaining number of copies exists. In a case where the remaining number of copies is "0" as a result of the determination, the spooled (stored in the storage unit 114) image data is deleted to complete this processing. Meanwhile, in a case where the remaining number of copies is "1" or more, the process returns to Step 311, and the sequence of the spool-and-print path and the print setting change acceptance processing are continuously made.

The above is the rough flow of the control of the data processing sequences in the MFP 100. An explanation will be given below on how the data processing sequences (paths) are controlled, by each pattern of changing copy number settings, in executing a job in which the copy-forgery-inhibited pattern printing is specified for the combination setting.

Figure 4:
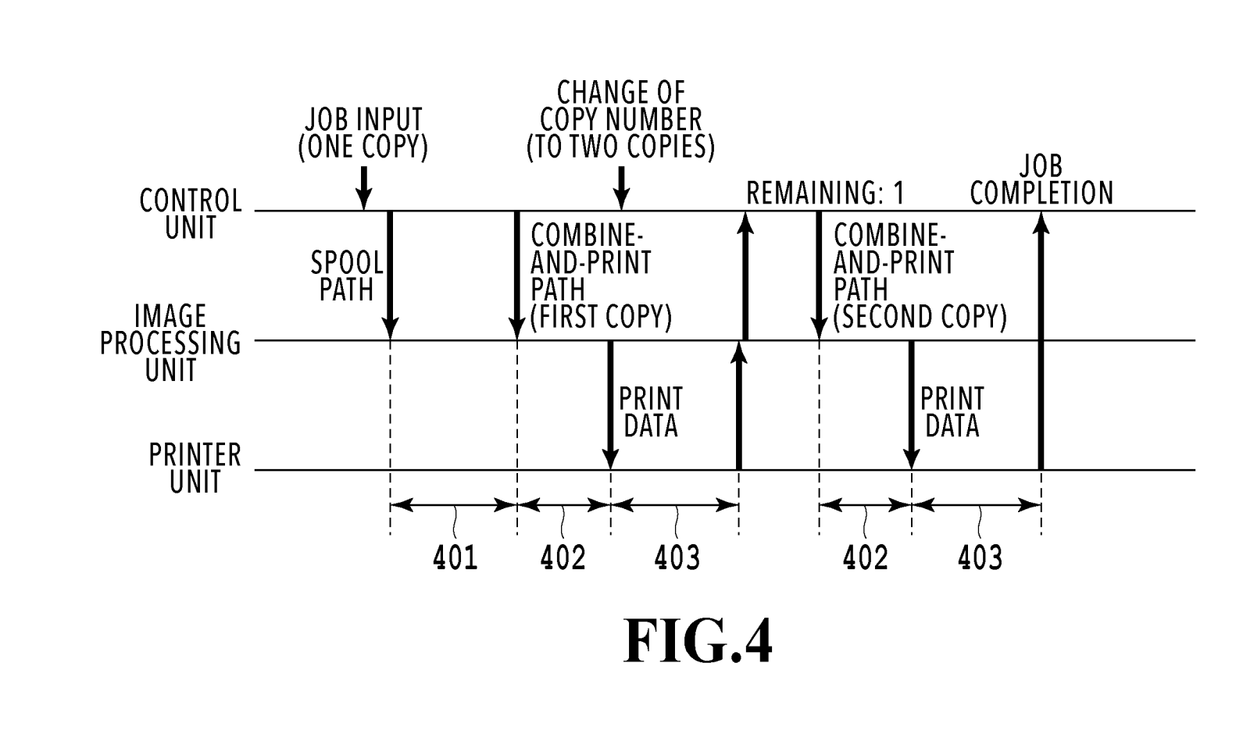
FIG. 4 is a diagram schematically representing a control sequence in the case where a copy number setting in a job has been changed in the middle of execution.

FIG. 4 is a diagram schematically representing a control sequence of a job in a pattern in which the copy number setting of "one copy (single)" at the time of job input has been changed to "two copies (plural)" in the middle of the job execution. Firstly, the control unit 110 determines a path to be executed based on the print setting of a job to be processed. In the print setting at the time of the job input, since the copy number setting is "one copy," it is determined that the combine-and-spool process is not required (No in Step 303). Accordingly, the spool path (Step 301) is followed by the start of the execution of the combine-and-print path (Step 304). In FIG. 4, a two-headed arrow 401 indicates a time period required for the spool path. Further, a two-headed arrow 402 indicates a time period required for generating and adding (combining) a copy-forgery-inhibited pattern image as part of the combine-and-print path. In addition, a two-headed arrow 403 indicates a time period, as part of the combine-and-print path, required from conversion of the combined image to which the copy-forgery-inhibited pattern is added into print data to the completion of one copy output by the printer unit 140. In this change pattern, the copy number setting has been changed to "two copies" before the completion of the first copy output. Accordingly, at the time of completion of the first copy printing (Yes in Step 306), the remaining number of copies becomes "1." Consequently, the combine-and-print path is to be executed again (Yes in Step 307 and No in Step 303). In other words, in the case of this change pattern, the combine-and-print path is continuously executed (repeated twice).

Figure 5:
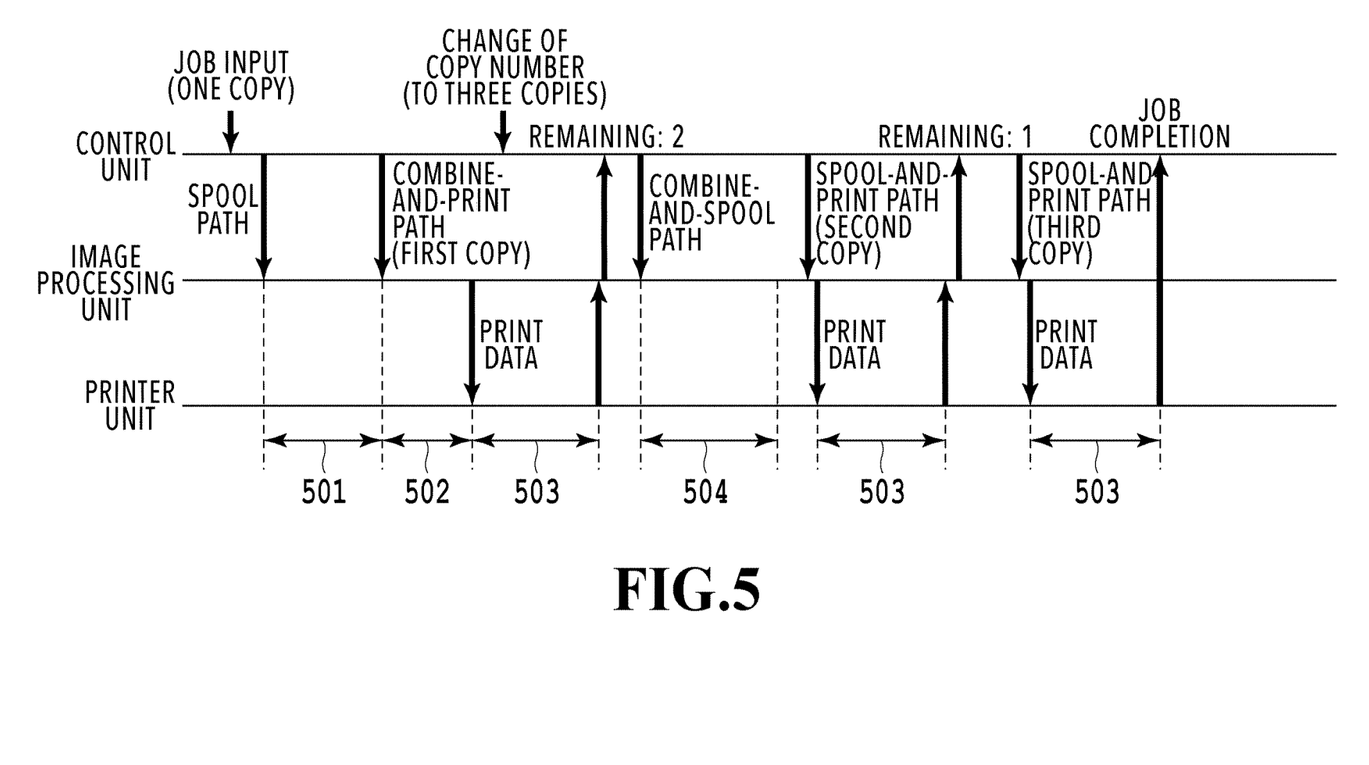
FIG. 5 is a diagram schematically representing a control sequence in the case where a copy number setting in a job has been changed in the middle of execution.

FIG. 5 is a diagram schematically representing a control sequence of a job in a pattern in which the copy number setting of "one copy (single)" at the time of job input has been changed to "three copies (plural)" in the middle of job execution. Firstly, the control unit 110 determines a path to be executed based on the print setting of a job to be processed. Since the copy number setting is "one copy" at the time of the job input, it is determined that, as in the case of FIG. 4, the combine-and-spool process is not required (No in Step 303). Accordingly, the spool path (Step 301) is followed by the start of the execution of the combine-and-print path (Step 304). In FIG. 5, a two-headed arrow 501 indicates a time period required for the spool path. Further, a two-headed arrow 502 indicates a time period required for generating and combining a copy-forgery-inhibited pattern image as part of the combine-and-print path. In addition, a two-headed arrow 503 indicates a time period, as part of the combine-and-print path, required from conversion of the combined image to which the copy-forgery-inhibited pattern is added into print data to the completion of one copy output by the printer unit 140. In this change pattern, the copy number setting has been changed to "three copies" before the completion of the first copy output. Accordingly, at the time of completion of the first copy printing (Yes in Step 306), the remaining number of copies becomes "2." Consequently, the combine-and-spool path will be executed next (Yes in Step 307, Yes in Step 303, and advance to Step 308). In FIG. 5, a two-headed arrow 504 indicates a time period required for the combine-and-spool path. Accordingly, a combined image in which a copy-forgery-inhibited pattern image is added to an original image is generated and is spooled again (stored in the storage unit 114). Once the combine-and-spool path has been completed (Yes in Step 310), then printing of a second copy is executed by the spool-and-print path (Step 311). At the time at which the printing of the second copy has been completed (Yes in Step 313), the remaining number of copies for the copy number setting becomes "1." Then, the printing of a third copy is to be executed again by the spool-and-print path (Yes in Step 314 and advance to Step 311). In other words, in the case of this change pattern, after the printing of the first copy is performed by the combine-and-print path, the path is switched to the spool-and-print path for the printing of the second and subsequent copies.

Figure 6:
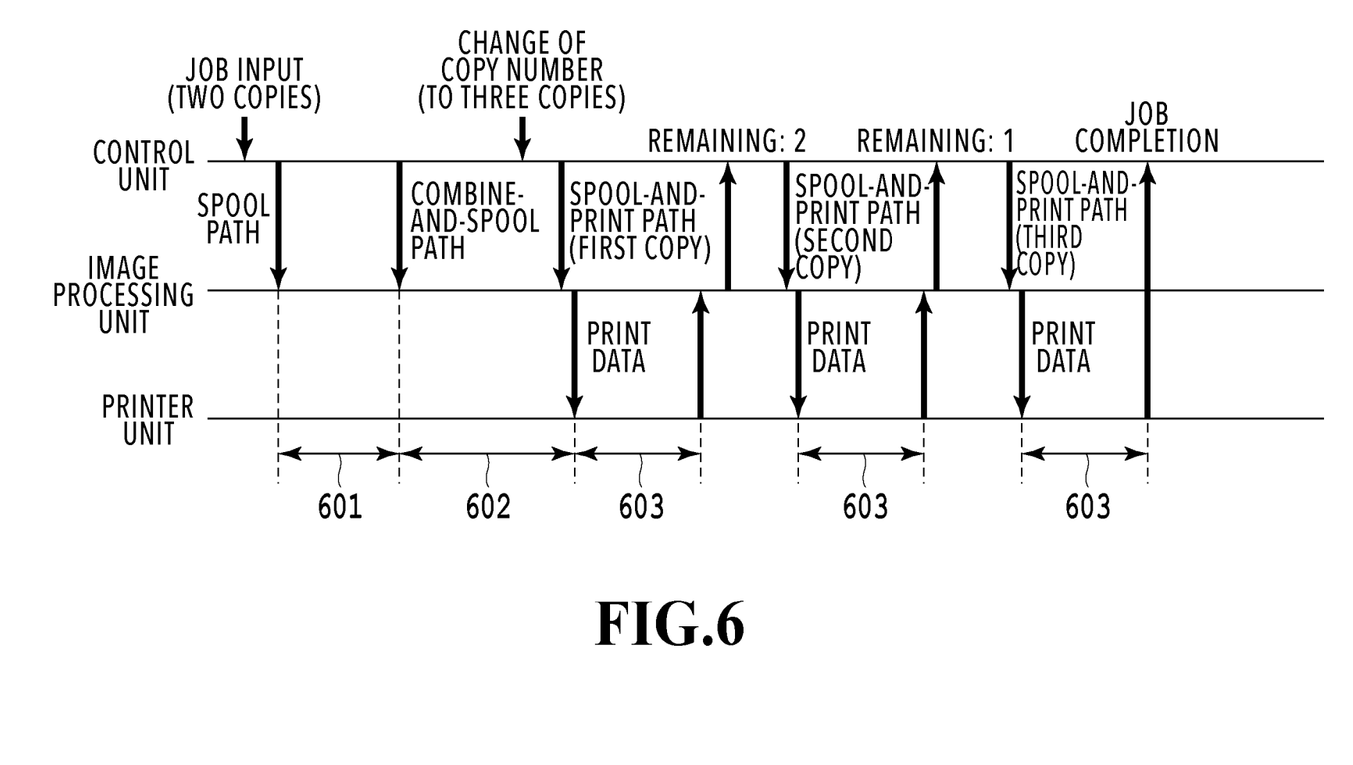
FIG. 6 is a diagram schematically representing a control sequence in the case where a copy number setting in a job has been changed in the middle of execution.

FIG. 6 is a diagram schematically representing a control sequence of a job in a pattern in which the copy number setting of "two copies" at the time of job input has been changed to "three copies" in the middle of job execution. Firstly, the control unit 110 determines a path to be executed based on the print setting of a job to be processed. Since the copy number setting at the time of job input is "two copies," which is contrary to the case of FIG. 4 and FIG. 5, it is determined that the combine-and-spool process is required (Yes in Step 303). Accordingly, the spool path (Step 301) is followed by the start of the execution of the combine-and-spool path (Step 308). In FIG. 6, a two-headed arrow 601 indicates a time period required for the spool path. Further, a two-headed arrow 602 indicates a time period required for the combine-and-spool path (generating and combining a copy-forgery-inhibited pattern image). Then, once the sequence of the combine-and-spool path has been completed (Yes in Step 310), the printing of a first copy is subsequently executed by the spool-and-print path (Step 311). A two-headed arrow 603 indicates this spool-and-print path, that is, a time period required from the reading of the combined image to which the copy-forgery-inhibited pattern is added from the storage unit 114 for converting the combined image into print data to the completion of one copy output by the printer unit 140. In this change pattern, the copy number setting has been changed to "three copies" before the completion of the output of the first copy. Accordingly, at the time at which the printing of the first copy has been completed (Yes in Step 313), the remaining number of copies becomes "2." Consequently, the spool-and-print path is to be executed again (Yes in Step 314 and advance to Step 311). At the time at which the printing of the second copy has been completed (Yes in Step 313), the remaining number of copies for the copy number setting becomes "1." Then, the printing of a third copy by the spool-and-print path is to be executed again (Yes in Step 314 and advance to Step 311). In other words, in the case of this change pattern, the combine-and-spool process is performed prior to the printing of the first copy, and then, all printing from the first to third copies are to be executed by the spool-and-print path.

As described above, even in a case where the copy number setting at the start of job execution is "one copy," for example, and the number of copies has been changed to be increased thereafter, printing is to be controlled so as to make the most use of the spool-and-print path. Consequently, a time period required for job completion can be reduced.

(Print Setting Change Acceptance Processing)

Figure 7:
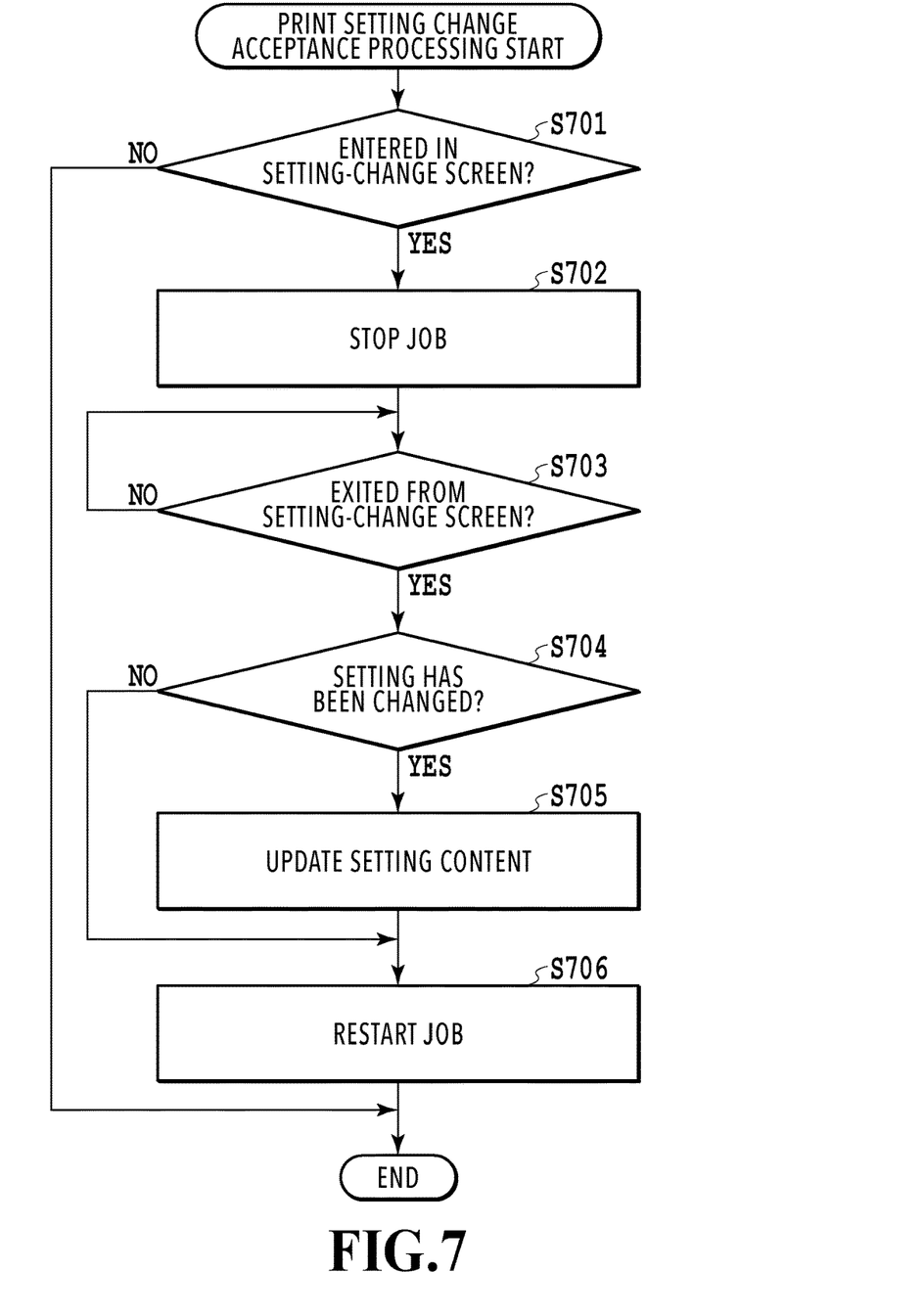
FIG. 7 is a flowchart showing the details of print setting change acceptance processing.

Next, an explanation will be given on print setting change acceptance processing executed in the above-described Step 305, Step 309, and Step 312 in the flow of FIG. 3. FIG. 7 is a flowchart showing the details of the print setting change acceptance processing.

Figure 8A:
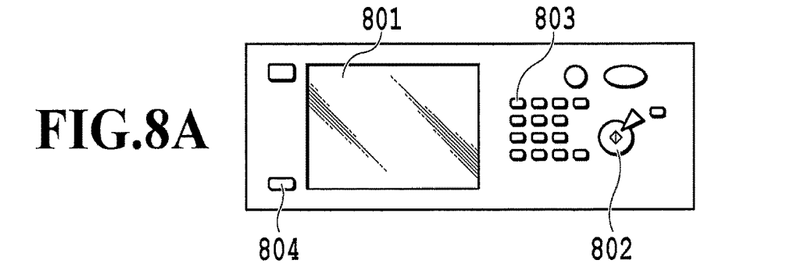
FIGS. 8A to 8D are diagrams each illustrating an operation unit.
Figure 8B:
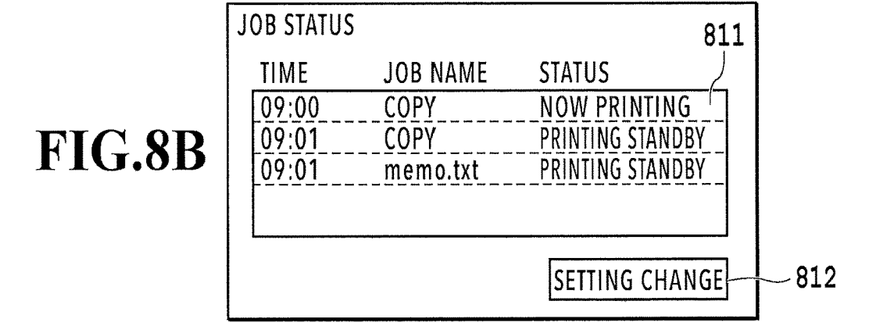

First of all, in Step 701, determination is made as to whether a user interface screen (UI screen) on the operation unit 150 makes a transition to a UI screen for accepting the change of print setting (hereinafter called a setting-change screen). FIG. 8A is a schematic view of the operation unit 150. A liquid crystal display unit 801 has a touch panel function, and once a soft key on the UI screen showing a display is pressed, its positional information is transmitted to the CPU 111 via the operation unit I/F 117. A start key 802 is used in the case where a user gives an instruction to start copying and the like. A ten-key 803 is composed of a button group including numbers and characters, and is used at the time of giving instructions on setting the number of copies and on switching screens for the liquid crystal display unit 801. A status-confirm key 804 is used at the time of giving an instruction to switch screens for displaying the details of residual capacity of consumables such as a toner and output sheets used in the MFP 100 and a list of jobs executed by the MFP 100. FIG. 8B is an example of a UI screen displayed on the liquid crystal display unit 801 in the case where the status-confirm key 804 has been pressed, and shows the list of jobs that are inputted into the MFP 100. In this example, one copy job started at the time of 09:00 is currently under printing. In a case where a user desires to change the setting of this copy job, the user selects a region 811 and presses a setting-change button 812. Then, the screen on the liquid crystal display unit 801 makes a transition to the setting-change screen shown in FIG. 8C. As such, once the transition to the setting-change screen has been detected, the process advances to Step 702. Meanwhile, in the case where the transition to the setting-change screen is not made, this processing ends.

In Step 702, a job currently under execution is stopped. Then, in Step 703, determination is made as to whether the setting-change screen is exited. In the setting-change screen of FIG. 8C, upon pressing an OK button 823 or a cancel button 824, the setting-change screen is exited to return to an original screen (in this case, the job list shown in FIG. 8B).

Figure 8C:
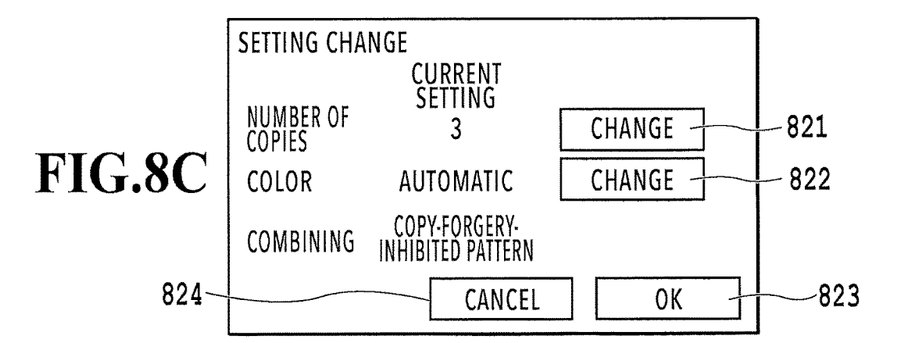
Figure 8D:
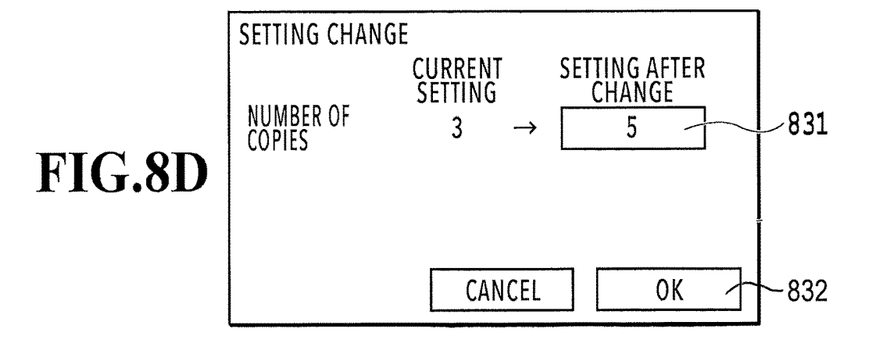

In Step 704, determination is made as to whether the print setting has been changed. Here, a specific example will be shown for an explanation. In the setting-change screen of FIG. 8C, the content of the current print setting in a selected job is displayed. FIG. 8C currently represents executing under conditions in which the copy number setting is "three copies," the color setting is "automatic," and the combination setting is a "copy-forgery-inhibited pattern." Moreover, for those items capable of changing settings, change buttons 821 and 822 are provided for accepting setting changes at the right side of each item. For instance, in a case where the user desires to change the setting of the number of copies, the user presses the change button 821. Then, a transition is made to a UI screen for changing the copy number setting as shown in FIG. 8D. Once the user inputs a desired number of copies using the ten-key 803, such a number after the change is displayed in a region 831. Further, upon the user's pressing of an OK button 832, the content of the copy number setting in a selected job is updated to such a content after the change. In this example, the number of output copies is updated from "three copies" to "five copies." Similarly, in a case where the user desires to change the color setting from "automatic" to "monochrome," the user presses the change button 822 so that a transition is made to a UI screen (not shown) for a color setting change, whereby the user makes the setting change. It should be noted that, in the setting-change screen of FIG. 8C, no change button exists on the right side of the combination setting. This means that no change can be made for the combination setting after the start of job execution. Incidentally, in a case where there is a job under "printing standby" among the job list, the change acceptance of the combination setting may be allowed. As such, in a case where the content of the print setting has been changed, in Step 705, the print setting is updated to the content after the change. Meanwhile, in a case where the content of the print setting has not been changed, the process advances to Step 706 and the job execution is restarted.

The above is the content of the print setting change acceptance processing. It should be noted that, in the flow of FIG. 7, in response to a transition to a print setting change screen, the execution of all jobs are temporarily stopped and then acceptance processing for setting change is performed. However, such acceptance processing may also be performed by background processing without stopping the jobs.
(Modified Example)

In the above-described embodiments, in the case where the copy number setting has been changed during the job execution accompanied by combination processing such as the copy-forgery-inhibited pattern, an aspect of switching to the spool-and-print path in which a combined image is once spooled for the printout instead of simply repeating the sequence of the combine-and-print path has been described. However, the applicable scope of the present invention is not limited to the above embodiments. A case of inputting a job for PDL printing which is not accompanied by the combination processing will be described below by way of example.

First of all, once a PDL print job is inputted, PDL data is spooled without making interpretation (corresponding to Step 301). Subsequently, determination is made as to whether the copy number setting at the time of job start is "one copy" or "plural copies (two or more copies)" (corresponding to Step 303). In a case where the copy number setting is "plural copies," the spooled PDL data is read out to perform rendering processing, and the acquired raster image data is spooled in a storage unit (corresponding to Step 308). Then, using the spooled raster image data, the printing of second and subsequent copies is performed (corresponding to Step 311).

Meanwhile, in the case where the copy number setting is "one copy," the spooled PDL data is read out to perform rendering processing, and the acquired raster image data is converted into print data in memory, which is then delivered to the printer unit 140 for making output (corresponding to Step 304). At this time, the raster image data is deleted from an image memory after outputting the page of the raster image data without being spooled in the storage unit. Alternatively, even the spooling has been made, along with the completion of output of the page, the raster image data is deleted from the storage unit. In such a case where the copy number setting has been changed before the completion of the PDL print job (where the copy number setting being "one copy"), a path is switched to the spool-and-print path in response to the remaining number of copies. For instance, in a case where the remaining number of copies is plural copies, the determination results in "YES" in Step 303 so as to be switched to the spool-and-print path. In other words, once PDL data is read out for performing rendering, the acquired raster image data is once spooled (corresponding to Step 308). This spooled raster image data is kept spooled until the completion of the job. Then, using the spooled raster image data, the printing for the remaining number of copies is to be made (corresponding to Step 311). Even in such a case, an effect of the present invention can be obtained.

As is evident from the above, the present invention has a feature that, once the change of the number of print copies for an executing job is accepted, the data processing sequence is switched in response to the remaining number of copies. In this case, the data processing sequence which is a target of switching can be defined as follows:

First data processing sequence: Predetermined image processing (such as combination processing and rendering) is performed on original data (first image data) to generate image data to be printed (second image data), which is loaded on a work area such as an image memory. Then, the loaded second image data is used for printing. The second image data loaded on the work area is deleted after the completion of the printing.

Second data processing sequence: Predetermined image processing (such as combination processing and rendering) is performed on original data (first image data) to generate image data to be printed (second image data), which is loaded on an image memory. The loaded second image data is once spooled in a storage area such as an HDD. Then, the spooled second image data is repeatedly used to perform printing for plural copies, and upon the completion of the printing for the number of all copies, the spooled second image data is deleted.

In the present invention, in the case where the copy number setting has been changed during job execution in the first data processing sequence, it is switched to the second data processing sequence so that a time period required for job completion is reduced compared to the case where the first data processing sequence is kept to be repeated for the changed number of copies. In addition, the larger the changed number of copies is, the more the effect is produced.

As such, according to the present invention, a time period required for printing can be reduced by responding to the change of the print setting after job input and by optimizing the data processing sequence until the job completion.
(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a time period required for printing can be reduced by responding to the change of the print setting after job input and by optimizing the data processing sequence until the job completion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-181699, filed Sep. 21, 2017 which is hereby incorporated by reference wherein in its entirety.

What is claimed is:

1. An apparatus for performing data processing for a print job, the apparatus comprising:
 a memory configured to retain image data;
 a non-volatile storage device configured to store image data; and
 a controller configured to control data processing in accordance with a number-of-copies setting of the print job, wherein
 the data processing includes first data processing and second data processing,
 in the first data processing,
 predetermined image processing is performed on first image data included in the print job to generate second image data,
 the second image data is retained in the memory,
 one copy of a print product is printed by using the second image data retained in the memory, and
 the second image data retained in the memory is deleted from the memory in response to the completion of printing of the one copy of the print product; and
 in the second data processing,
 predetermined image processing is performed on the first image data included in the print job to generate third image data,
 the third image data is stored in the non-volatile storage device, and
 a plurality of copies of print products are printed by reading the third image data from the non-volatile storage device, and wherein
 based on acceptance of a change of the number-of-copies setting during job execution by the first data processing, after completion of output of the executed job in units of copies, the controller switches from the first data processing to the second data processing based on a value of a remaining number of copies.

2. The apparatus according to claim 1, wherein the controller maintains the first data processing in response to the remaining number of copies being one, and switches from the first data processing to the second data processing in response to the remaining number of copies being two or more.

3. The apparatus according to claim 1, wherein the second image data and the third image data are data obtained by combining the first image data with a copy-forgery-inhibited pattern image.

4. The apparatus according to claim 1, wherein the second image data and the third image data are the same image data.

5. The apparatus according to claim 1, wherein in the first data processing, the second image data is not stored in the non-volatile storage device.

6. A method of controlling data processing for a print job, the control method comprising the steps of:
 determining data processing to be executed in accordance with a number-of-copies setting of the print job to start execution of the print job; and
 in a case where a change of the number-of-copies setting is accepted during the job execution by the determined data processing, switching the data processing based on a value of a remaining number of copies, wherein
 the data processing includes first data processing and second data processing,
 in the first data processing,
 predetermined image processing is performed on first image data included in the print job to generate second image data,
 the second image data is retained in a memory,
 one copy of a print product is printed by using the second image data retained in the memory, and
 the second image data retained in the memory is deleted from the memory in response to the completion of printing of the one copy of the print product; and
 in the second data processing,
 predetermined image processing is performed on the first image data included in the print job to generate third image data,
 the third image data is stored in a non-volatile storage device, and
 a plurality of copies of print products are printed by reading the third image data from the non-volatile storage device, and wherein
 based on acceptance of a change of the number-of-copies setting during job execution by the first data processing, after completion of output of the executed job in units of copies,
 in the switching step, switching is made from the first data processing to the second data processing.

7. An image forming apparatus, comprising:
 a printer configured to print image data on a sheet by executing a print job including setting a number of copies;
 an image processing circuit configured to generate different image data by performing predetermined image processing on first image data included in the print job;
 a memory configured to retain the generated different image data;
 a non-volatile storage device configured to store the generated different image data; and
 a controller configured to perform
 a first control in which, in a case where the number of copies for the print job for which an instruction for execution is received is set at one, the printer is caused to perform one copy by using the generated different image data retained in the memory and the different image data is deleted from the memory in response to the completion of printing of the one copy, or a second control in which, in a case where the number of copies for the print job for which the instruction for execution is received is set at two or more, the printer is caused to print the plurality of copies by using the different image data stored in the non-volatile storage device, wherein the controller switches from the first control to the second control by receiving an instruction to increase the number of copies set for the print job before the different image data retained in the memory is deleted in the first control.

8. The image forming apparatus according to claim 7, wherein the controller makes the switching control at the time of completion of an output in units of copies.

9. The image forming apparatus according to claim 7, wherein, in a case where the remaining number of copies is plural, the controller switches from the first control to the second control for job execution.

10. The image forming apparatus according to claim 7, the controller deletes the different image data in a case where the number of copies to be printed for the print job becomes zero while the second control is performed.

11. The image forming apparatus according to claim 7, wherein in the first control, the controller deletes the different image data from the non- volatile storage.

12. A method of controlling an image forming apparatus, including:

a printer configured to print image data on a sheet by executing a print job including setting a number of copy, an image processing circuit configured to generate different image data by performing predetermined image processing on first image data included in the print job, a memory configured to retain the generated different image data, a non-volatile storage device configured to store the generated different image data, and a controller, the method comprising the steps of:

in a first control in a case where the number of copies for the print job for which an instruction for execution is received is set at one, causing the printer to perform one copy by using the different image data retained in the memory and deleting the different image data from the memory in response to the completion of printing of the one copy, or in a second control in a case where the number of copies for the print job for which the instruction for execution is received is set at two or more, causing the printer to print the plurality of copies by using the different image data stored in the non-volatile storage device; and switching from the first control to the second control by receiving an instruction to increase the number of copies set for the print job before the different image data stored in the memory is deleted in the first control.

* * * * *